United States Patent [19]

Lin

[11] Patent Number: 5,150,980
[45] Date of Patent: Sep. 29, 1992

[54] FIXTURE FOR A FOLDING BED

[76] Inventor: Yung-Hsiung Lin, No. 99 Tai Yuan Road, Taipei, Taiwan

[21] Appl. No.: 778,444

[22] Filed: Oct. 17, 1991

[51] Int. Cl.[5] .................................................. F16D 1/00
[52] U.S. Cl. ...................................... 403/24; 403/205; 403/174; 5/200.1; 5/110
[58] Field of Search ............... 403/205, 231, 174, 175, 403/24; 5/200.1, 282.1, 110, 82, 625

[56] References Cited

U.S. PATENT DOCUMENTS

| | | | |
|---|---|---|---|
| 648,749 | 5/1900 | Jennings | 403/174 X |
| 1,089,723 | 3/1914 | Quincy | 5/110 |
| 3,426,367 | 2/1969 | Bradford | 5/82 |
| 4,016,612 | 4/1977 | Barile, Sr. | 5/200.1 |

Primary Examiner—Andrew V. Kundrat
Attorney, Agent, or Firm—Fleit, Jacobson, Cohn, Price, Holman & Stern

[57] ABSTRACT

A fixture for a folding bed, comprising a 3-way pipe connector secured to the frame tubes of a folding bed at one corner by a rivet, and a side tube movably fastened in said 3-way pipe connector, wherein said side tube has an elongated slot through which said rivet is inserted to control the moving range of said side tube in said 3-way pipe connector, fastening holes for fastening support means to secure a tent, a mosquito net, a stand for intravenous infusion or casters to said folding bed. The side tube further comprises a flexible strip made through punching process, which flexible strip has a stop block made on the free end thereof to automatically stop the side tube from moving back into the pipe connector once it is extended out.

3 Claims, 4 Drawing Sheets

U.S. Patent    Sep. 29, 1992    Sheet 2 of 4    5,150,980
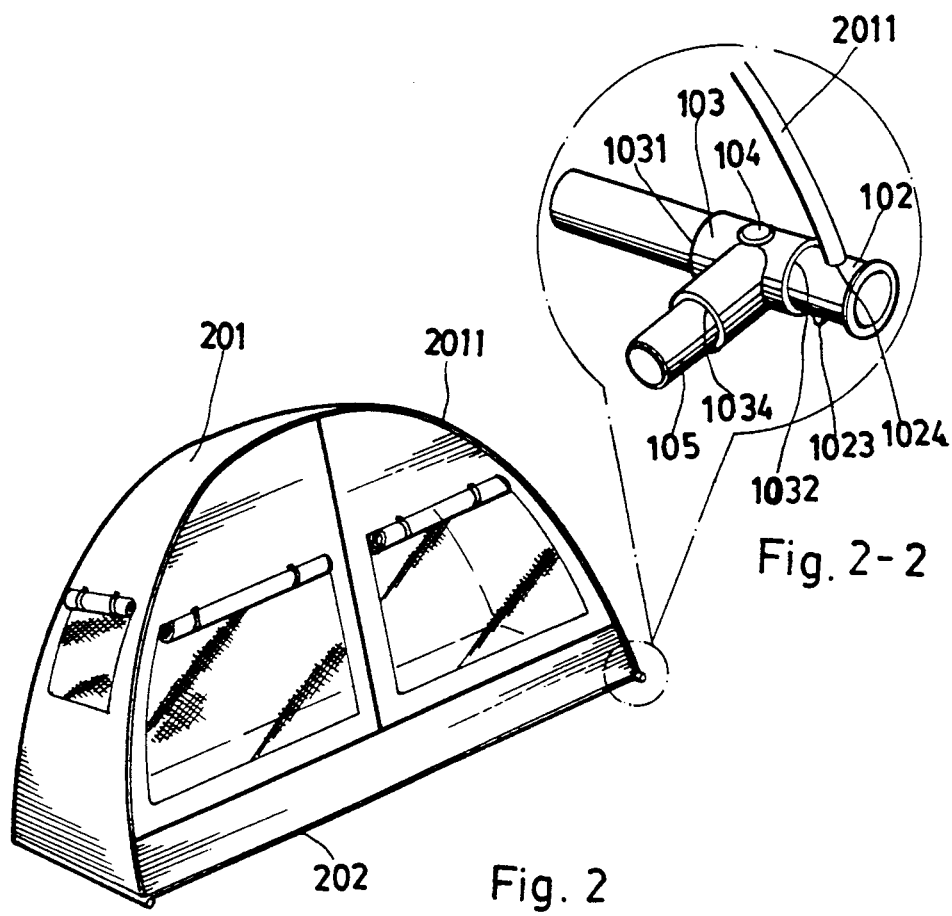
Fig. 2-2
Fig. 2
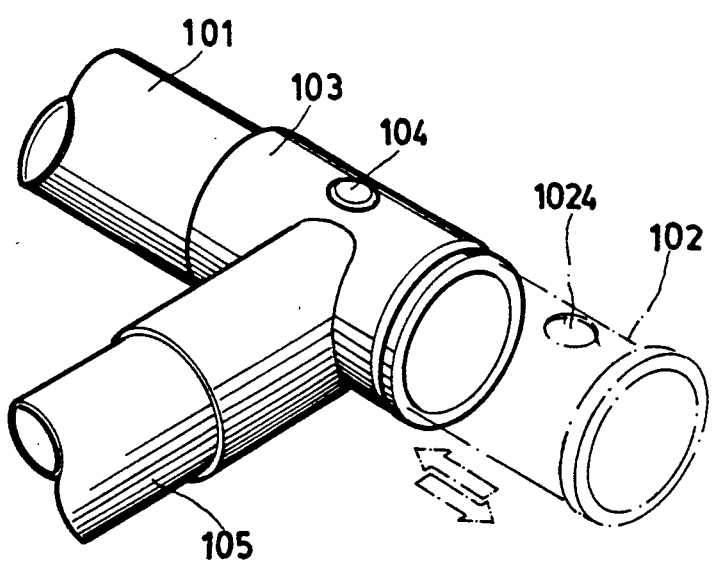
Fig. 2-1

FIXTURE FOR A FOLDING BED

BACKGROUND OF THE INVENTION

The present invention relates to fixtures and relates more particularly to a fixture for a folding bed which can be conveniently attached to the frame tube of a folding bed for holding a tent, a mosquito net or a stand for intravenous infusion.

Several folding frame structures have been disclosed and used in the production of beds and chairs. When a bed or chair is made foldable, it can be folded up to reduce space occupation for easy transportation or storage. The present invention has been accomplished to provide a fixture for attaching to a folding bed permitting it to be used for multiple purposes. By attaching a fixture or a plurality of fixtures of the present invention to a folding bed, a folding bed can be matched with other devices for different purposes and functions. For example, a stand for intravenous infusion may be attached to a folding bed by the present invention so that a folding bed can be used as a sickbed. By attaching a plurality of fixture assemblies of the present invention to a folding bed at the four corners thereof, a tent or mosquito net can be fastened to a folding bed for protection against weather or for keeping out mosquitoes.

BRIEF DESCRIPTION OF THE DRAWINGS

The present invention will now be described by way of example with reference to the annexed drawings, in which:

FIG. 2 illustrates an use of the present invention to secure a tent to a folding bed;

FIG. 2-1 is a perspective assembly view of the present invention, showing that the side tube can be drawn out of the pipe connector and then pushed back into place;

FIG. 2-2 is an enlarged view taken on FIG. 2, showing that an arch rib is fastened in the fastening holes on the side tube to stretch a tent;

DETAILED DESCRIPTION OF THE PREFERRED EMBODIMENT

Figure 1:
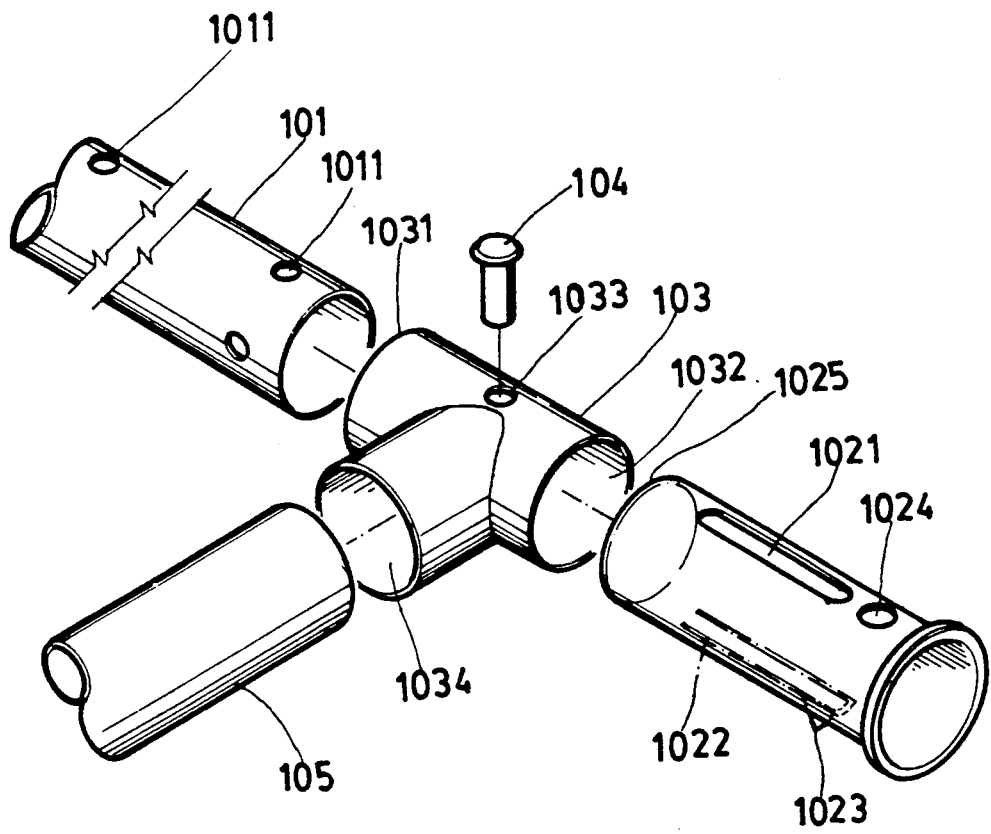
FIG. 1 is an exploded perspective view of the preferred embodiment of the present invention;.

Referring to FIG. 1, a fixture assembly in accordance with the present invention is generally comprised of a pipe connector 103 secured to a transverse frame tube 101 at one end of a folding bed and a longitudinal frame tube 105 at one side of said folding bed and for holding a side tube 102 therein, permitting said side tube 102 to be drawn out and then pushed back into place. In the present preferred embodiment, the pipe connector 103 is made from a 3-way tube having three outlet holes 1031, 1032, 1034 at three ends, a rivet hole 1033 on the outer wall thereof at the middle of the transverse axis thereof (through the outlet holes 1031, 1032). The pipe connector 103 further has a uniform inner diameter slightly larger than the outer diameter of the transverse frame tube 101 as well as the longitudinal frame tube 105. The transverse frame tube 101, which is transversely disposed at one end of a folding bed, has a rivet hole 1011 on the outer wall adjacent to the terminal end thereof corresponding to the rivet hole 1033 on the pipe connector 103 for fastening the pipe connector 103. The side tube 102 is made from a tube in outer diameter slightly smaller than the inner diameter of the transverse frame tube 101 so that it can be inserted through the outlet holes 1032, 1031, into the boring bore of the transverse frame tube 101 and moved to slide in and out. As illustrated in FIG. 1, the side tube has an elongated slot 1021 longitudinally made on the outer wall thereof at a suitable location, a unitary flexible strip 1022 formed of part of the side tube 102 through the process of punching at a location opposite to said elongated slot 1021, wherein said unitary flexible strip 1022 has a stop block 1023 on the free end thereof at an outer side.

Referring to FIG. 2-1, once the pipe connector 103 is attached to the transverse and longitudinal frame tubes 101, 105 with the transverse frame tube 101 inserted into the outlet hole 1031 and the longitudinal frame tube 105 inserted in the outlet hole 1034, the side tube 102 is inserted through the outlet hole 1032, the outlet hole 1031 into the boring bore of the transverse frame tube 101 permitting the elongated slot 1021 to be respectively aligned with the rivet hole 1011 on the transverse frame tube 101 and the rivet hole 1033 on the pipe connector 103, and then, a rivet 104 is fastened into the rivet holes 1011, 1033 and the elongated slot 1021 to secure the slide tube 102, the pipe connector 103, the transverse frame tube 101 and the longitudinal frame tube 105 together, permitting the side tube 102 to slide in and out of the pipe connector 103. Because the rivet 104 is inserted through the elongated slot 1021 on the side tube 102, the moving range of the side tube 102 in the pipe connector 103 is confined by the elongated slot 1021. Further, when the side tube 102 is drawn out of the pipe connector 103, the stop block 1023 on the flexible strip 1022 will be stopped against the peripheral edge of pipe connector 103 at the outlet hole 1032 to prohibit the side tube 102 from moving into the pipe connector 103 again. Because of the elastic material property of the flexible strip 1022, the stop block 1023 can be squeezed in direction toward the elongated slot 1021 so that the side tube 102 can be inserted into the pipe connector 103 again.

Referring to FIGS. 2 and 202, there is shown an application of the present invention to secure a tent 201 to a folding bed 202. By attaching four fixtures to the folding bed 202 at the four corners thereof, the two arch ribs 2011 and of the tent 201 can be respectively fastened in the fastening holes 1024 on the side tubes 102 of the fixtures. As indicated, when the side tube 102 of each fixture is pulled out of the pipe connector 103 thereof, it will be firmly retained in place by means of the rivet 104 and the stop block 1023 on the flexible strip 1022. Therefore, when the arch ribs 2011 are respectively fastened in the fixtures at the four corners of the folding bed 202, the tent 201 is stretched and firmly secured to the folding bed 202 for protection against weather.

Figure 3:
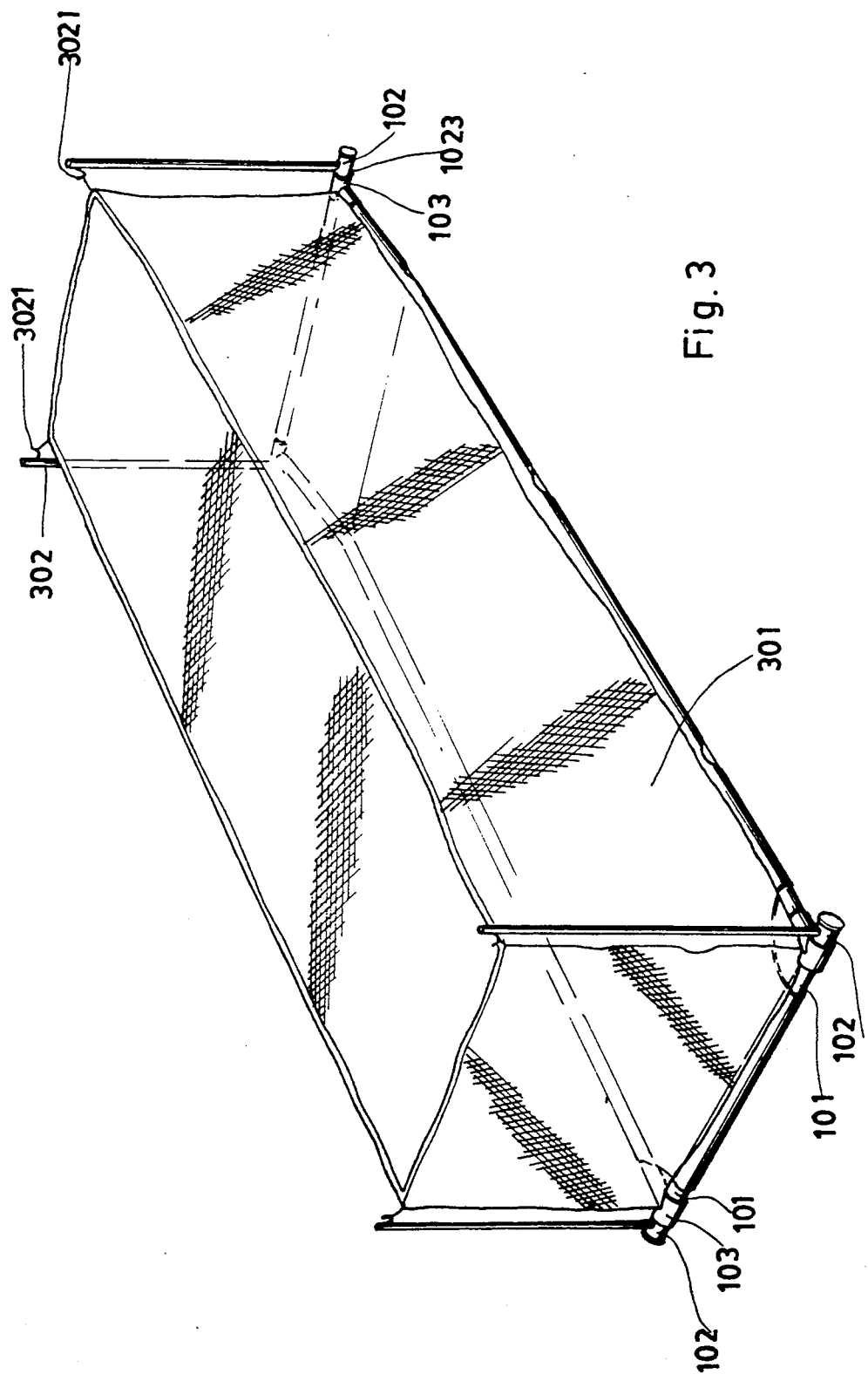
FIG. 3 illustrates another use of the present invention to secure a mosquito net to a folding bed.

Referring to FIG. 3, there is shown another application of the present invention to secure a mosquito net 301 to a folding bed. As indicated, the side tube 102 of each fixture is drawn out of the corresponding pipe connector 103 for holding a support 302 which has a bottom end fastened in the fastening hole 1024 on the side tube 102 and a top end attached with a hook 3021 for hanging up a mosquito net 301.

Figure 4:
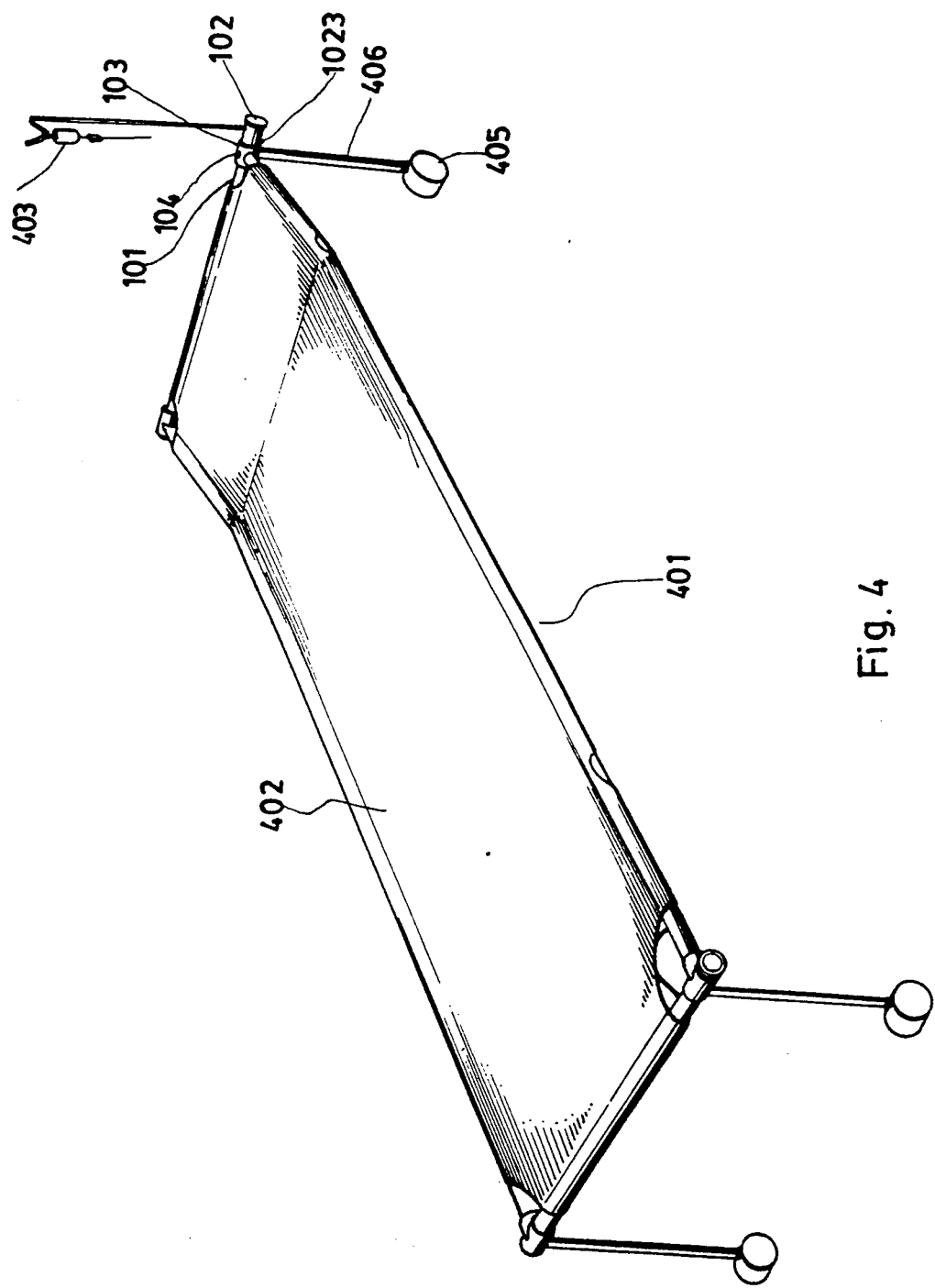
FIG. 4 illustrates still another use of the present invention to secure rollers and a stand for intravenous infusion to a folding bed making it applicable for use as a sickbed.

Referring to FIG. 4, there is shown still another application of the present invention to secure castors 405 and a stand for intravenous infusion 403 to a folding bed 402 permitting a folding bed 402 to be used as a sickbed 401. For this application purpose, a hole (not shown) shall be made on the pipe connector 103 opposite to the rivet hole 1033 for fastening a castor's frame. The stand for intravenous infusion 403 pipe connector 103 can be fastened in the fastening hole 1024 on the side tube 102 of either fixture at either corner of the folding bed 402.

The present invention has been described by way of examples, however, it is to be understood that the drawings are designed for purposes of illustration only, and are not intended as a definition of the limits and scope of the invention disclosed.

What is claimed is:

1. A fixture comprising:
   a pipe connector made from a 3-way tube having a first outlet sleeved on a transverse frame tube on a folding bed at one end and firmly secured thereto by a rivet, a second outlet sleeved on a longitudinal frame tube on said folding bed at one side, a third outlet;
   a side tube inserted through said third outlet and said first outlet into said transverse frame tube, said side tube having an elongated slot longitudinally made on the outer wall thereof at a suitable location through which said rivet is inserted, a unitary flexible strip formed thereon through the process of punching at a location opposite to said elongated slot, and a fastening hole on the outer wall thereof for fastening supporting means, said unitary flexible strip having a fixed end at one end secured to said side tube and a free end at an opposite end with a stop block made thereon at an outer side relative to said elongated slot; and
   wherein said side tube is retained to said pipe connector by said rivet and can be moved in and out within the range of said elongated slot; said stop block on said flexible strip will be stopped against the peripheral edge of said third outlet to prohibit said side tube from moving back into said pipe connector again, or said stop block on said flexible strip can be squeezed inwards permitting said side tube to be moved inside said pipe connector.

2. The fixture of claim 1, wherein said transverse frame tube has a rivet hole in size and location corresponding to the rivet hole on said pipe connector and the width of the elongated slot on said side tube for fastening said rivet.

3. The fixture of claim 1, wherein said stop block on said flexible strip is made in such a location that it is stopped against the peripheral edge of said third outlet when said side tube is extended out of said pipe connector permitting said rivet to stop at one end in said elongated slot.

* * * * *